US010447643B2

(12) United States Patent
Raji et al.

(10) Patent No.: US 10,447,643 B2
(45) Date of Patent: Oct. 15, 2019

(54) PRESENTING PREVIOUSLY PRESENTED CONTENT ITEMS STORED BY USERS OF A SOCIAL NETWORKING SYSTEM BASED ON USER-SPECIFIED CRITERIA

(71) Applicant: Facebook, Inc., Menlo Park, CA (US)

(72) Inventors: Vijaye Ganesh Raji, Redmond, WA (US); Calvin Patrick Grunewald, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 192 days.

(21) Appl. No.: 14/625,618

(22) Filed: Feb. 18, 2015

(65) Prior Publication Data

US 2016/0241504 A1    Aug. 18, 2016

(51) Int. Cl.
| | |
|---|---|
| *G06Q 50/00* | (2012.01) |
| *H04L 12/58* | (2006.01) |
| *H04W 4/029* | (2018.01) |
| *G06Q 10/10* | (2012.01) |

(52) U.S. Cl.
CPC ............ *H04L 51/32* (2013.01); *G06Q 50/01* (2013.01); *H04W 4/029* (2018.02); *G06Q 10/10* (2013.01)

(58) Field of Classification Search
CPC .......... G06Q 10/10–1097; G06Q 50/01; H04L 51/06–066; H04L 51/20; H04L 51/32; H04W 4/02–028
See application file for complete search history.

(56) References Cited

U.S. PATENT DOCUMENTS

| | | | | |
|---|---|---|---|---|
| 2010/0250131 A1* | 9/2010 | Relyea | ................... | G01C 21/20 701/469 |
| 2010/0332282 A1* | 12/2010 | Bradley | ............. | G01C 21/3438 705/7.19 |
| 2012/0149346 A1* | 6/2012 | Akhtar | .............. | G06F 17/30902 455/414.2 |
| 2012/0173373 A1* | 7/2012 | Soroca | .............. | G06F 17/30867 705/26.3 |
| 2013/0024511 A1* | 1/2013 | Dunn | ..................... | G06Q 50/01 709/204 |
| 2013/0024788 A1* | 1/2013 | Olsen | ..................... | G06Q 10/10 715/753 |
| 2013/0031487 A1* | 1/2013 | Olsen | ..................... | G06Q 50/01 715/751 |
| 2013/0198652 A1* | 8/2013 | Dunn | ................... | G06F 3/0484 715/751 |
| 2013/0203442 A1* | 8/2013 | LeBlanc | .............. | G06Q 10/109 455/456.3 |

(Continued)

*Primary Examiner* — David R Lazaro
*Assistant Examiner* — Julian Chang
(74) *Attorney, Agent, or Firm* — Fenwick & West LLP

(57) ABSTRACT

A social networking system permits users to store content presented by the social networking system and subsequently access the stored content associated with the users. A content item is stored in association with a user profile of a user that stored the content item and with one or more criteria specified by the user that cause presentation of the stored content item to the user when satisfied. When attributes associated with a user satisfy at least a threshold number of criteria associated with a stored content item, the stored content item is included in a selection process used by the social networking system to determine content that is presented to the user.

20 Claims, 3 Drawing Sheets

(56) References Cited

U.S. PATENT DOCUMENTS

| | | | |
|---|---|---|---|
| 2014/0006081 A1* | 1/2014 | David | G06Q 10/1095 |
| | | | 705/7.19 |
| 2015/0112814 A1* | 4/2015 | Stokes | G06Q 30/0276 |
| | | | 705/14.66 |
| 2015/0121413 A1* | 4/2015 | Ramakrishnan | H04N 21/454 |
| | | | 725/25 |
| 2015/0215816 A1* | 7/2015 | Abou-Elkheir | |
| | | | H04N 21/25866 |
| | | | 370/230 |
| 2015/0245095 A1* | 8/2015 | Gonzalez | H04N 21/4542 |
| | | | 725/28 |
| 2015/0262278 A1* | 9/2015 | Lin-Hendel | G06Q 30/0623 |
| | | | 705/26.62 |
| 2015/0302539 A1* | 10/2015 | Mazar | G08B 21/0211 |
| | | | 705/3 |
| 2016/0210655 A1* | 7/2016 | Cottle | G06Q 30/0244 |
| 2016/0225013 A1* | 8/2016 | Hartman | G06F 17/3053 |

\* cited by examiner

PRESENTING PREVIOUSLY PRESENTED CONTENT ITEMS STORED BY USERS OF A SOCIAL NETWORKING SYSTEM BASED ON USER-SPECIFIED CRITERIA

BACKGROUND

This disclosure relates generally to presenting content via a social networking system, and more particularly to presenting a social networking system user with content previously stored by the social networking system user.

Social networking systems maintain and present a large amount of content to their users. For example, a social networking system presents a user with descriptions of actions performed by other social networking system users, with image or video data provided to the social networking system by other users, or with descriptions of events associated with social networking system users. As numbers of social networking system users increase, the amount of content presented to social networking system users also increases, making it difficult for a user of a social networking system to review or interact with the amount of content presented by the social networking system. For example, when a user is presented with content that the user finds interesting, the user be unable interact with the content when it is initially viewed (e.g., viewing a link at work to a video that the user wants to view at home) or may desire to review the content at a more convenient time. However, because conventional social networking systems provide a user with new content as the content is received, the user may have difficulty accessing a content item after it was initially presented.

While certain social networking systems allow a user to store a content item presented to the user and subsequently retrieve the stored content item, these social networking system often require a user to manually retrieve the saved content. However, content items stored by a user may be relevant to the user at times when it is impractical for the user to manually retrieve the stored content items. For example, if a user stores an advertisement including a coupon having an expiration date the user plans to use on a purchase, the stored advertisement is more relevant to the user before the expiration date has passed. Hence, presenting stored content items to a user when the user requests the stored content items may prevent the user from viewing a stored content item when it is relevant to the user.

SUMMARY

A social networking system allows a user to store content items presented to the user by the social networking system (e.g., posts, advertisements, groups, games, messages, and other types of content) and subsequently access the stored content items. To allow the user to more easily access the stored content items associated with the user, when the user identifies a content item to be stored, the user also specifies one or more criteria that, when satisfied, cause the content item to be eligible for presentation to the user. In various embodiments, the one or more criteria are based on attributes associated with the user, so the content item is eligible for presentation to the user when the user's attributes satisfy at least a threshold number of the criteria. This allows the user to identify criteria specifying when a stored content item is most likely to be relevant to the user and social networking system to present the stored content item to the user when the stored content item is more likely to be relevant to the user. For example, the user specifies criteria indicating a threshold distance of a location associated with the stored content item, so the social networking system presents the stored content item to the user when the user is within a threshold distance of a location associated with the stored content item.

Various criteria may be associated with a stored content item by a user when the user stores the content item that, when satisfied, cause presentation of the stored content item to the user. For example, criteria identifies an event or a type of event (e.g., an opening of a store, a release of a movie, etc.) associated with a stored content item. Additional example criteria for presenting a stored content item include: a geographic location associated with a content item, an action performed by a user (e.g., posting content, sharing content, indicating a preference for content, refreshing a feed of content, establishing a connection with an additional user, etc.), a type of connection between a client device associated with a user and the social networking system, a type of client device (e.g., mobile device, desktop device, etc.) used to access the social networking system, and one or more characteristics of a connection between a client device associated with the user and the social networking system (e.g., bandwidth).

When at least a threshold number of attributes associated with the user by the social networking system satisfies criteria associated with a stored content item by the user, the social networking system includes the stored content item in a selection process used by the social networking system to select content for presentation to the user. For example, the user associates criteria with a stored advertisement for a department store specifying a threshold distance from a department store location, so the stored advertisement is included in a selection process when a location associated with the user is within the threshold distance of a department store location for at least a threshold amount of time. In one embodiment, the selection process determines a measure of relevance of the stored content item to the user, determines measures of relevance of additional content items to the user, and selects content from the additional content items and the stored content item for presentation based on the measures of relevance. For example, the social networking system ranks stored content items and additional content items based on their measures of relevance and selects content for presentation based on the ranking. Additional information may also be used when selecting content from the additional content items and the stored content items for presentation. For example, a type of client device used to present the content or a type of connection between the client device and the social networking system may modify selection of content for presentation.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
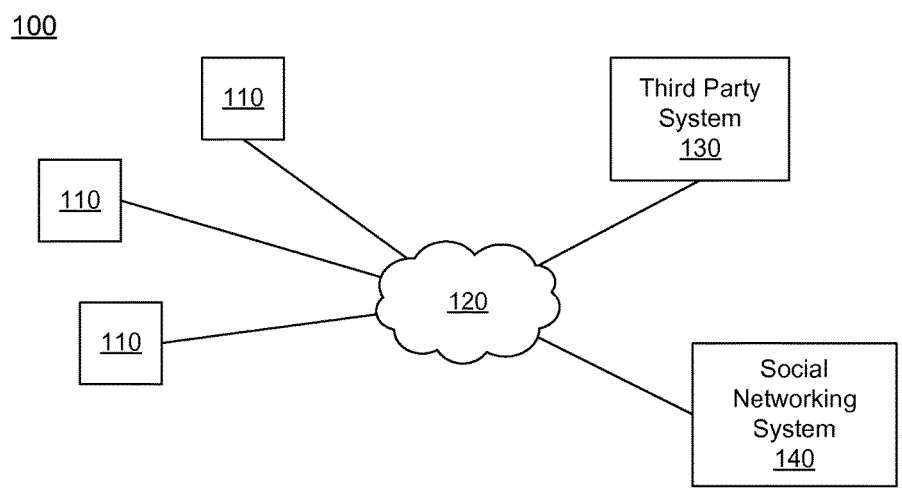
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
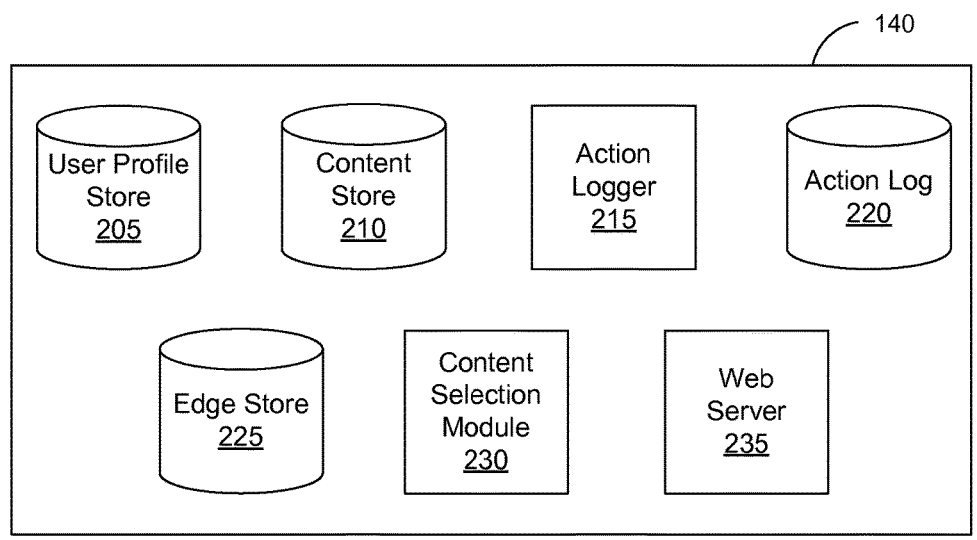
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a content selection module 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

In some embodiments, a user profile associated with a user includes content items previously presented to the user by the social networking system 140 and stored by the user. For example, the user profile includes identifiers associated with content items the user has stored. Information describing a stored content item may also be included in the user profile along with an identifier associated with the stored content item. Example types of information associated with a stored content item include a type of the stored content item, a location associated with the stored content item, a time when the stored content item was stored by the user. Additionally, one or more criteria specified by the user are associated with a stored content item. When at least a threshold number of criteria associated with a stored content item are satisfied by attributes of the user, the stored content item is eligible for presentation to the user. Example criteria associated with a stored content item include: a location associated with the user being within a threshold distance of a geographic location associated with the stored content item (e.g., a retail location specified in the stored content item, a location of an event specified by the stored content item), a geographic location associated with a user, a threshold duration a user is associated with a specified location, a threshold time difference between a current time and a time associated with the stored content item (e.g., a time associated with an event included in the content item), an action performed by a user (e.g., posting content, sharing content, indicating a preference for content, commenting on content, establishing a connection with another user or with an object), a type of connection between the user and another user (e.g., a user associated with the content item), a characteristic of a client device 110 used to access the social networking system 140 (e.g., mobile device, desktop device, operating system), and a characteristic of a connection between a client device 110 associated with the user and the social networking system 140 (e.g., available bandwidth, networking protocol used for the connection). However, criteria may be any information suitable for comparison to one or more attributes associated with a user.

Additionally, a user profile may include information describing a format in which a stored content item is presented when criteria associated with the stored content item are satisfied by attributes associated with a user. For example, a format associated with a stored content item indicates that the content item is presented to a user via a text message or via a story included in a news feed of content items presented to the user. Additionally, a format associated with a stored content item specifies a position in a display relative to other content items in which the stored content item is presented, specifies a duration during which the stored content item is presented, or specifies any other suitable information identifying presentation of the stored content item. The format associated with a stored content item may also specify additional content presented in conjunction with the stored content item when the stored content item is presented. Examples of additional content presented in conjunction with a stored content item include: an identification of criteria satisfied by attributes of the user causing presentation of the stored content item or other information providing a reason for presentation of the stored content item, additional information associated with the stored content item (e.g., directions to a location associated with the stored content item), and one or more options for managing the stored content item (e.g., delete the stored content item, modify rules associated with the stored content item, etc.). For example, an advertisement for sunglasses that a user has stored is presented to the user when the user is within a quarter-mile of a location associated with a retailer selling the sunglasses is presented along with a map identifying the location associated with the retailer. A user associated with a stored content item may modify the format associated with a content item. For example, the user may modify the additional information presented in conjunction with the stored content item.

Additionally, one or more privacy settings may be associated with a stored content item by a user to regulate access of other social networking system users to the stored content item; the privacy settings may be associated with the content identifier of the stored content item. A user may retrieve one or more stored content items associated with the user by interacting with the user's user profile. Stored content items may be organized and presented by type, by chronological order, or by any other suitable organizational method. Storage of content items by social networking system users is further described in U.S. patent application Ser. No. 14/590,290, filed on Jan. 6, 2015, U.S. patent application Ser. No. 13/747,714, filed on Jan. 23, 2013, U.S. patent application Ser. No. 13/316,374, filed on Dec. 9, 2011, each of which is hereby incorporated by reference in its entirety.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking 140 system using a brand page associated with the entity's user profile. Other social networking system users may connect to the brand page to receive information posted to the brand page or to receive information from the brand page. A user profile associated with the brand page may include information about the entity itself, providing users with background or informational data about the entity.

The content store 210 stores objects that each represent various types of content or "content items." Examples of content represented by a content item include a page post, a status update, a comment, a photograph, a video, a link, a shared content item, a gaming application achievement, a check-in event at a local business, a brand page, an indication a content item was shared with another user or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140. In various embodiment, the content store 210 includes one or more user identifiers associated with various content items who have been presented with the content items. For example, the content store 210 associates user identifiers of users who have previously been presented with a content item in association with the content item.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 for storage in the action log 220 by the application for recordation and association with the user by the social networking system 140.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user based on a selection process. In various embodiments, the content selection module 230 determines a measure of relevance of various content items to the user based on attributes associated with the user (e.g., a client device 110 associated with the user, actions associated with the user, demographic information associated with the user, connections between the user and additional users, etc.) by the social networking system 140 and characteristics associated with various content items (e.g., a format associated with a content item, a date or a time associated with the content item, a geographic location associated with the content item, one or more topics in the content item, actions by additional users with the content item, additional users associated with the content item, etc.). For example, if a user comments on a content item, indicates a preference for the content item, shares the content item, and stores the content item within a time interval from a current time, the content selection module 230 determines that the content item has a higher measure of relevance to the user than an additional content item shared by the user at a time greater than the time interval from the current time. Characteristics of a client device 110 associated with a user may also be used by the content selection module 230 when determining measures of relevance associated with content items. For example, if a content item includes video data, the content selection module 230 determines that a measure of relevance of the content item to a user is greater if a connection between a client device 110 associated with the user and the social networking system 140 has at least a threshold bandwidth than if the connection between the client device 110 and the social networking system 140 has less than the threshold bandwidth.

Based on the measures of relevance, the content selection module 230 applies a selection process to the content items to select content items for presentation to the user. For example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user. As further described below in conjunction with FIG. 3, the selection process used by the content selection module 230 may include content items not presented to the user as well as content items stored by the user. Measures of relevance are determined for the stored content items as well as for the content items not previously presented to the user, and the content selection module 230 selects content from the stored content items as well as from the content items not yet presented to the user based on their associated measures of relevance.

In one embodiment, the social networking system 140 allows its users to exchange messages with each other and presents a user with a thread including multiple messages exchanged between users. For example, the thread includes messages exchanged between the user and an additional user. Alternatively, the thread includes messages between the user and multiple additional users. An application associated with the social networking system 140 may execute on client devices 110 associated with various users; the application communicates messages received from a user to the social networking system 140 for presentation to one or more additional users via a thread and presents messages received from one or more other users to the user via the social networking system 140 to the user via a thread. In this embodiment, the content selection module 235 may include one or more advertisements or selected content items, as further described below in conjunction with FIG. 3, in a thread presented to a user along with messages for presentation to the user.

Additionally, the content selection module 235 may present content to a user by generating information describing a virtual world for presentation to the user. The virtual world presents perceptual elements to the user representing various content items and allows the user to manipulate elements within the virtual world. For example, the virtual world includes two- or three-dimensional representations of content items, users, or other objects maintained by the social networking system 140. In some embodiments, the virtual world includes avatars corresponding to various users, objects, pages, or other content items that are visible to users of the social networking system 140. When presenting representations of content items to users via a virtual world, the content selection module 235 selects content items to present via the virtual world and determines placement of representations of representations of content items relative to each other based at least in part on measures of relevance of the content items to various users. In this embodiment, the content selection module 235 may include representations of one or more advertisements or content items previously stored by a user and selected for presentation, as further described below in conjunction with FIG. 3, in the virtual world.

The web server 235 links the social networking system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
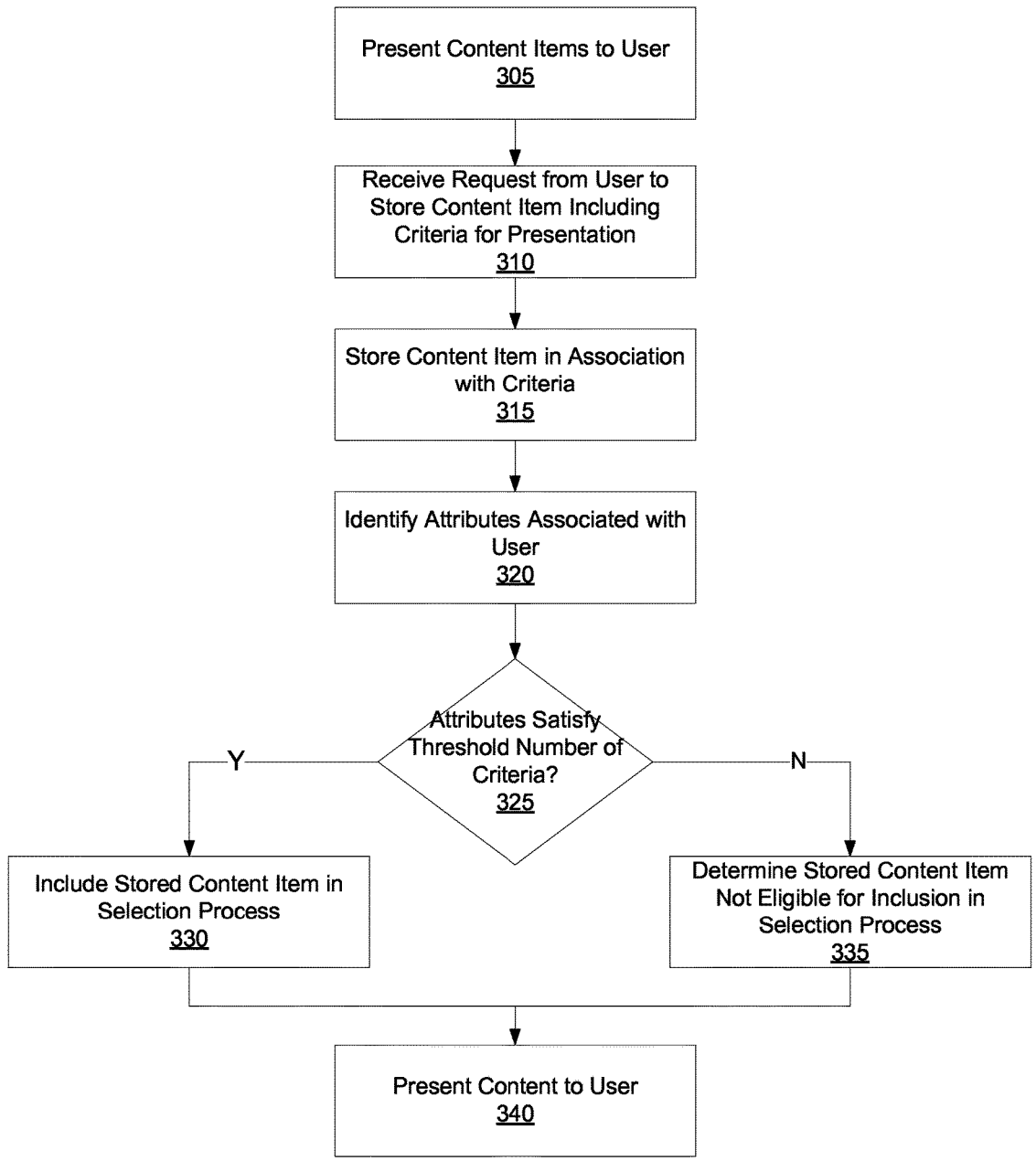
FIG. 3 is a flowchart of a method for presenting a stored content item to a user of a social networking system associated with the stored content item, in accordance with an embodiment.

Presenting a Stored Content Item to a User Associated with the Stored Content Item FIG. 3 is flow chart of one embodiment of a method for presenting a stored content item to a user of a social networking system 140 associated with the stored content item. In other embodiments, the method includes different, additional, or fewer steps than those depicted by FIG. 3. Additionally, in some embodiments, the steps described in conjunction with FIG. 3 may be performed in different orders.

The social networking system 140 presents 305 content items to a user of the social networking system 140. Content items may be presented 305 to the user in any suitable format. Example formats for presenting 305 content items include: a news feed including multiple content items selected for the user by the social networking system 140, a web page including content items, a notification message identifying one or more content items, a text message including a content item, and an interface presented in conjunction with a news feed. Content items presented 305 by the social networking system 140 include content posted to a page maintained by the social networking system 140, content (e.g., audio, video, or image data) provided to the social networking system 140 by a user of the social networking system 140 (i.e., a status update), a link to retrieve content from a third party system 130, applications, and advertisements. One or more content items are presented 305 in conjunction with an option to store the content items in association with a user profile associated with the user. For example, if a user interacts with a content item, a list of options including an option to store the content item, an option to share the content item, an option to comment on the content item, and an option to indicate a preference for the content item are presented to the user.

The social networking system 140 receives 310 a request from the user to store a content item. For example, the social networking system 140 receives 310 the request when the user selects an option to store a content item presented in conjunction with the content item. The request includes information identifying the user (e.g., a user identifier associated with the user by the social networking system 140), information identifying the content item (e.g., an identifier associated with the content item by the social networking system 140, a network address for retrieving the content item, the content item itself), and information specifying one or more criteria that, when satisfied by attributes of the user, cause the content item to be eligible for presentation to the user. For example, when the user selects the option to store a content item, the user is presented with an interface allowing the user to specify the one or more criteria. In some embodiments, the interface presents various criteria, allowing the user to select one or more criteria or to refine criteria. Criteria specified or selected by the user are included in the request along with the information identifying the user and the information identifying the content item.

When the social networking system 140 receives 310 the request, the social networking system 140 stores 315 the content item identified by the request in association with the criteria specified by the user that cause presentation of the content item to the user if satisfied by attributes associated with the user. In some embodiments, criteria may be associated with the content item by default and presents the default criteria to the user. The user modifies the default criteria or specifies alternative criteria when communicating the request to store the content item to the social networking system 140. Default criteria may be associated with the content item based on characteristics of the content item (e.g., a location, a time, a topic, or a user associated with the content item). For example, if the user stores a news feed story about a tourist attraction, the social networking system 140 presents the user with default criteria that presents the story to the user when a client device 110 associated with the user is within a threshold distance of the attraction. The user may modify the default rules associated with a stored content item. Alternatively, no default criteria are presented to the user, and the user specifies any suitable criteria for association with the content item through the interface or through any suitable channel. In the previous example, the user may modify the criteria associated with the stored content item so the stored content item is presented on a date specified by the user.

Criteria for determining a stored content item is eligible for presentation to the user may be based on attributes of the user and/or characteristics of the content item. Example criteria include: a location associated with the user being within a threshold distance of a geographic location associated with the content item (e.g., a retail location specified in the content item, a location of an event specified by the content item), a geographic location associated with a user, a threshold duration a user is associated with a specified location, a threshold time difference between a current time and a time associated with a content item (e.g., a time associated with an event included in the content item), an action performed by a user (e.g., posting content, sharing content, indicating a preference for content, commenting on content, establishing a connection with another user or with an object), a type of connection between the user and another user (e.g., a user associated with the content item), a characteristic of a client device 110 used to access the social networking system 140 (e.g., mobile device, desktop device, operating system type), a characteristic of a connection between a client device 110 associated with the user and the social networking system 140 (e.g., available bandwidth, networking protocol used for the connection), and a specified date or time. For example, criteria associated with the content item specifies that the content item is presented to the user when the user establishes a connection with an additional user that has indicated a preference for the content item. As an additional example, criteria associated with a content item specifies that the content item is presented to the user when a current time determined from a client device 110 associated with the is within a threshold time period of a time associated with the content item.

In some embodiments, one or more formats in which the stored content item is presented when criteria associated with the stored content item are satisfied are also associated with the stored content item. For example, a format associated with a stored content item specifies that the stored content item is presented as a content item in a news feed including multiple content items, is presented as a text message sent to the user, is presented via a notification message sent to the user, or is presented using any other suitable format. Additionally, information may be associated with a stored content item specifying additional content for presentation in conjunction with the stored content item. For example, information associated with the stored content item specifies presentation of one or more criteria associated with the stored content item that are satisfied are presented when the stored content item is presented. Other reasons describing why a stored content item is presented may be presented along with the stored content item, such as attributes of the user satisfying the criteria associated with the stored content item or any other suitable information. As another example, one or more commands or options are identified by information associated with a stored content item for presentation in conjunction with the stored content item, such as an option to delete the stored content item, an option to modify one or more criteria associated with the stored content item, an option to share the stored content with other users of the social networking system 140, or any other suitable options.

The social networking system 140 identifies 320 attributes associated with the user. Examples attributes associated with a user include: a geographic location associated with a client device 110 associated with the user, a time zone associated with the user, a time associated with a user interaction with the social networking system 140, an interaction performed by the user on the social networking system 140, an interaction performed by the user and communicated to the social networking system 140, connections between the user and additional users of the social networking system 140, connections between the user and objects maintained by the social networking system 140, a type of client device 110 associated with the user used to access the social networking system 140, characteristics of a connection between a client device 110 associated with the user and the social networking system 140. Based on the identified attributes, the social networking system 140 determines 325 whether the attributes satisfy at least a threshold number of criteria associated with the stored content item. For example, if a stored advertisement for a retailer is associated with criteria specifying presentation of the advertisement if a location associated with the user is within five miles of a retail location associated with the advertisement for at least ten minutes, the social networking system 140 determines whether a location associated with the user (e.g., a location of a client device 110 associated with the user) is within five miles of a retail location and if the location associated with the user is within five miles of the retail location after ten minutes elapse. If the social networking system 140 determines 325 attributes associated with the user satisfy at least a threshold number of criteria associated with the stored content item, the content item is included 330 in a process of selecting content items for presentation to the user. However, if the one or more attributes associated with the user satisfy less than the threshold number of criteria associated with the stored content item, the social networking system 140 determines 335 the stored content item is not eligible for inclusion in the selection process.

As described above in conjunction with FIG. 2, the selection process selects content for the user, and the selected content is subsequently presented 340 to the user. In some embodiments, the selection process determines a measure of relevance of each content item that is eligible for inclusion in the selection process to the user and selects content items for presentation to the user based on the measures of relevance. A measure of relevance of a content item to a user may be based on attributes associated with the user (e.g., a client device 110 associated with the user, actions associated with the user, demographic information associated with the user, connections between the user and additional users, etc.) by the social networking system 140 and characteristics associated with various content items (e.g., a format associated with a content item, a date or a time associated with the content item, a geographic location associated with the content item, one or more topics in the content item, action by additional users with the content item, additional users associated with the content item, etc.). For example, a measure of relevance of a stored advertisement including a promotion code for a retailer is higher relative to measures of relevance for other stored content items or for other content items if the user stored several additional content items associated with the retailer or is within a threshold distance of a location associated with the retailer.

Based on the measures of relevance of each content item that is eligible for presentation to the user, the social networking system 140 selects content items for presentation to the user and presents 340 the select content items to the user. For example, the social networking system 140 ranks stored content items and additional content items based on their measures of relevance to the user and selects content items having at least a threshold position the ranking for presentation to the user. In some embodiments, if the stored content item is presented 340, it is presented based on a format specified by information associated with the stored content item. For example, the stored content item is included in a news feed along with additional content items or is presented via a notification message presented to the user. As described above in conjunction with FIG. 2, the format associated with the stored content item may identify additional information presented in conjunction with the stored content item. For example, when the stored content item is presented 340, criteria associated with the stored content item satisfied by attributes of the user are presented in conjunction with the stored content item, providing information to the user indicating why the stored content item is presented 340.

Additionally, one or more options may be presented in conjunction with the stored content item if it is presented 340. Examples of options presented in conjunction with the stored content item include: an option to view additional stored content items associated with the user, an option to remove the stored content item from the user's user profile, an option to share the stored content item with another user of the social networking system 140, an option to comment on the stored content item, an option to indicate a preference for the stored content item, and an option to view context in which the stored content item was previously presented to the user (e.g., content items presented along with the stored content item when the content item was previously presented to the user). In some embodiments, content items are presented 340 to the user in a summarized format along with an option to fully view the stored content item. For example, if a user stores a page post, when the stored page post is presented 340 to the user, a portion of the stored page post is presented 340 (e.g., a title and an image associated with the page as well as an indication that the page post was previously stored by the user) along with an option to view the complete stored page post.

Example Presentation of a Previously Presented Stored Content Item

Figure 4:
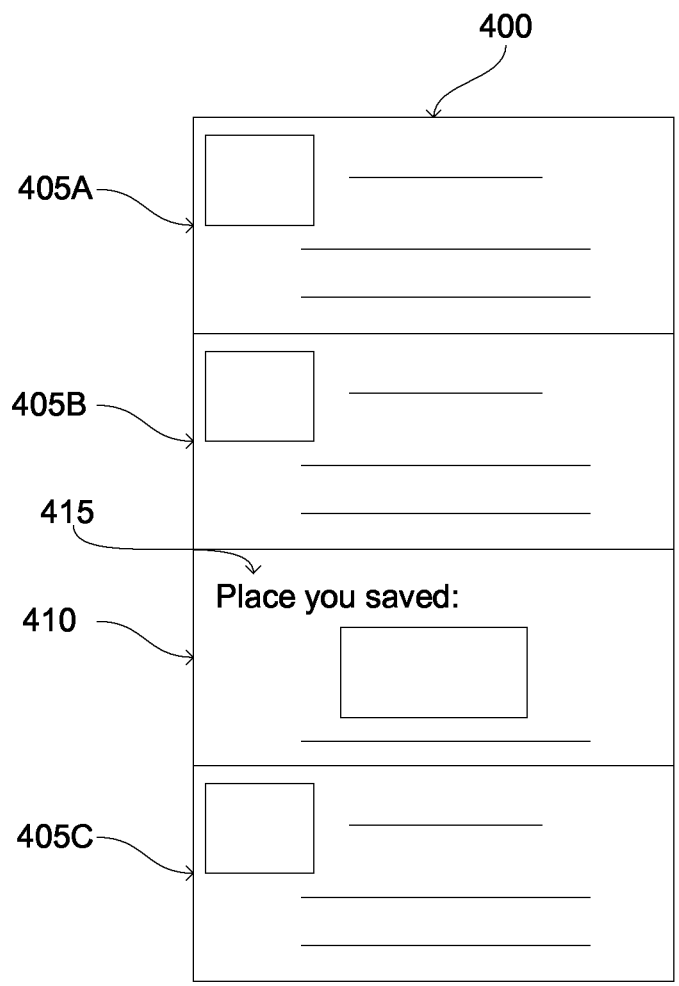
FIG. 4 is an example user interface showing presentation of a stored content item to a social networking system user, in accordance with an embodiment.

FIG. 4 shows an example of presenting a stored content item 410 in a feed 400 of content items presented to a user. In the example of FIG. 4, the feed 400 includes content items 405A, 405B, 405C, which were not previously presented to the user and stored content item 410, which was previously stored by the user. Additionally, an indication 415 is presented along with the stored content item 410 to notify the user that the stored content item 410 was previously stored by the user. In some embodiments, the indication 415 may include additional information describing one or more reasons for presentation of stored content item 410 in the feed 400 or information describing stored content item 410. For example, the indication 415 is a caption indicating that the stored content item 410 is a place or location that was stored by the user. Example information presented by the indication 415 include: a type of stored content item 410 (e.g., a place, a photograph, an advertisement, a link), a time stored content item 410 was stored, and a context in which stored content item 410 was originally presented (e.g., a page post, an advertisement).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

presenting a plurality of content items maintained by a social networking system to a user of the social networking system;

receiving, at the social networking system, a request from the user to store a content item from the plurality of content items in association with the user, the request identifying the user, identifying the content item, including one or more criteria specified by the user to be satisfied by attributes of the user for the content item to be eligible for presentation to the user, and identifying a format for presenting the content item to the user when attributes associated with the user satisfy one or more additional criteria, the format specifying a position in a display relative to other content items in which the content item is presented and identifying one or more options for selection by the user to be presented in conjunction with the stored content item the one or more options selected from a group consisting of: an option to delete the content item, an option to share the content item with another user, an option to view additional stored content items associated with the user, and any combination thereof;

storing the content item identified by the request in association with the user, in association with the one or more criteria specified by the user, and in association with the format for presenting the content item to the user;

identifying one or more attributes associated with the user;

determining the content item is eligible for presentation to the user if the identified one or more attributes associated with the user satisfy at least a threshold number of the one or more criteria specified by the user;

including the content item in a selection process identifying content for presentation to the user in response to determining the content item is eligible for presentation to the user;

presenting content to the user based on the selection process, the content including other content items and the content item presented in the position in the display relative to other content items specified by the format stored in association with the content item in response to the selection process identifying the content item and the attributes associated with the user satisfying the one or more additional criteria; and presenting, in conjunction with the content item, the one or more options identified by the format stored in association with the content item.

2. The method of claim 1, wherein presenting the content to the user based on the selection process comprises:

presenting the content item along with information describing the criteria satisfied by the identified one or more attributes associated with the user.

3. The method of claim 1, wherein determining the content item is eligible for presentation to the user if the identified one or more attributes associated with the user satisfy at least a threshold number of the one or more criteria specified by the user comprises:

determining the content item is eligible for presentation to the user if a current time associated with the user accessing the social networking system satisfies one or more criteria specified by the user.

4. The method of claim 1, wherein determining the content item is eligible for presentation to the user if the identified one or more attributes associated with the user satisfy at least a threshold number of the one or more criteria specified by the user comprises:

determining the content item is eligible for presentation to the user if a location associated with the user is within a threshold distance of a location associated with the content item specified by one or more criteria specified by the user.

5. The method of claim 1, wherein determining the content item is eligible for presentation to the user if the identified one or more attributes associated with the user satisfy at least a threshold number of the one or more criteria specified by the user comprises:

determining the content item is eligible for presentation to the user if the social networking system received a type of interaction from the user associated with the content item specified by one or more criteria specified by the user.

6. The method of claim 1, wherein determining the content item is eligible for presentation to the user if the identified one or more attributes associated with the user satisfy at least a threshold number of the one or more criteria specified by the user comprises:

determining the content item is eligible for presentation to the user if a type of connection between a client device associated with the user and the social networking system matches a type of connection between the client device and the social networking system specified by one or more criteria specified by the user.

7. The method of claim 1, wherein presenting content to the user based on the selection process comprises:

determining measures of relevance to the user of the content item and one or more additional content items; and selecting content from the content item and the one or more additional content items for presentation to the user based at least in part on the determined measures of relevance.

8. The method of claim 1, wherein the format for presenting the content item to the user specifies: presenting the content item in a feed including multiple content items, presenting the content item as a text message sent to a client device associated with the user, or presenting the content item as a notification message sent to the client device associated with the user.

9. The method of claim 1, wherein the format specifies additional information presented in conjunction with the content item.

10. The method of claim 9, wherein the additional information presented in conjunction with the content item identifies one or more criteria specified by the user that are satisfied by attributes associated with the user.

11. A computer program product comprising a non-transitory computer readable storage medium having instructions encoded thereon that, when executed by a processor, cause the processor to:

present a plurality of content items maintained by a social networking system to a user of the social networking system;

receive, at the social networking system, a request from the user to store a content item from the plurality of content items in association with the user, the request identifying the user, identifying the content item, including one or more criteria specified by the user to be satisfied by attributes of the user for the content item to format specifying a position in a display be eligible for presentation to the user, and identifying a format for presenting the content item to the user when attributes associated with the user satisfy one or more additional criteria, the relative to other content items in which the content item is presented and identifying one or more options for selection by the user to be presented in conjunction with the stored content item the one or more options selected from a group consisting of: an option to delete the content item, an option to share the content item with another user, an option to view additional stored content items associated with the user, and any combination thereof;

store the content item identified by the request in association with the user, in association with the one or more criteria specified by the user, and in association with the format for presenting the content item to the user;

identify one or more attributes associated with the user;

determine the content item is eligible for presentation to the user if the identified one or more attributes associated with the user satisfy at least a threshold number of the one or more criteria specified by the user;

include the content item in a selection process identifying content for presentation to the user responsive to determining the content item is eligible for presentation to the user;

present content to the user based on the selection process, the content including other content items and the content item presented in the position in the display relative to other content items specified by the format stored in association with the content item in response to the selection process identifying the content item and the attributes associated with the user satisfying the one or more additional criteria; and presenting, in conjunction with the content item, the one or more options identified by the format stored in association with the content item.

12. The computer program product of claim 11, wherein present the content to the user based on the selection process comprises:
present the content item along with information describing the criteria satisfied by the identified one or more attributes associated with the user.

13. The computer program product of claim 11, wherein determine the content item is eligible for presentation to the user if the identified one or more attributes associated with the user satisfy at least a threshold number of the one or more criteria specified by the user comprises:
determine the content item is eligible for presentation to the user if a current time associated with the user accessing the social networking system satisfies one or more criteria specified by the user.

14. The computer program product of claim 11, wherein determine the content item is eligible for presentation to the user if the identified one or more attributes associated with the user satisfy at least a threshold number of the one or more criteria specified by the user comprises:
determine the content item is eligible for presentation to the user if a location associated with the user is within a threshold distance of a location associated with the content item specified by one or more criteria specified by the user.

15. The computer program product of claim 11, wherein determine the content item is eligible for presentation to the user if the identified one or more attributes associated with the user satisfy at least a threshold number of the one or more criteria specified by the user comprises:
determine the content item is eligible for presentation to the user if the social networking system received a type of interaction from the user associated with the content item specified by one or more criteria specified by the user.

16. The computer program product of claim 11, wherein determine the content item is eligible for presentation to the user if the identified one or more attributes associated with the user satisfy at least a threshold number of the one or more criteria specified by the user comprises:
determine the content item is eligible for presentation to the user if a type of connection between a client device associated with the user and the social networking system matches a type of connection between the client device and the social networking system specified by one or more criteria specified by the user.

17. The computer program product of claim 11, wherein present content to the user based on the selection process comprises:
determine measures of relevance to the user of the content item and one or more additional content items; and
select content from the content item and the one or more additional content items for presentation to the user based at least in part on the determined measures of relevance.

18. The computer program product of claim 11, wherein the format for presenting the content item to the user specifies: presenting the content item in a feed including multiple content items, presenting the content item as a text message sent to a client device associated with the user, or presenting the content item as a notification message sent to the client device associated with the user.

19. The computer program product of claim 11, wherein the format specifies additional information presented in conjunction with the content item.

20. The computer program product of claim 19, wherein the additional information presented in conjunction with the content item identifies one or more criteria specified by the user that are satisfied by attributes associated with the user.

* * * * *